United States Patent [19]
Bahns

[11] Patent Number: 5,946,286
[45] Date of Patent: Aug. 31, 1999

[54] CUSTOMIZED GRAPHICS FOR DUAL LAYER OPTICAL DISCS

[75] Inventor: Ted L. Bahns, White Bear Lake, Minn.

[73] Assignee: Imation Corp., Oakdale, Mich.

[21] Appl. No.: 08/821,241

[22] Filed: Mar. 20, 1997

[51] Int. Cl.[6] .................................................. G11B 7/24
[52] U.S. Cl. ................................. 369/275.3; 369/275.4
[58] Field of Search .............................. 369/275.1, 275.3, 369/275.5, 283, 288, 286, 274, 272, 292, 275.4; 283/113; 156/245

[56] References Cited

U.S. PATENT DOCUMENTS

| | | | |
|---|---|---|---|
| 4,656,106 | 4/1987 | Holland et al. | 430/2 |
| 4,819,223 | 4/1989 | Gregg | 369/275.4 |
| 4,834,843 | 5/1989 | Koop et al. | 205/68 |
| 4,929,821 | 5/1990 | Kocznar et al. | 235/493 |
| 5,101,184 | 3/1992 | Antes | 235/454 |
| 5,267,756 | 12/1993 | Molee et al. | 283/86 |
| 5,346,654 | 9/1994 | Kodaka et al. | 264/1.33 |
| 5,452,282 | 9/1995 | Abraham | 369/273 X |
| 5,509,991 | 4/1996 | Choi | 156/245 |
| 5,540,966 | 7/1996 | Hintz | 428/64.1 |
| 5,607,188 | 3/1997 | Bahns et al. | 283/113 |
| 5,608,728 | 3/1997 | Schiewe | 369/275.4 |
| 5,675,570 | 10/1997 | Ohira et al. | 369/275.1 |
| 5,751,690 | 5/1998 | Ohira et al. | 369/275.3 |

FOREIGN PATENT DOCUMENTS

| | | |
|---|---|---|
| 0 566 032 A2 | 10/1993 | European Pat. Off. . |
| 0 643 391 A1 | 3/1995 | European Pat. Off. . |
| 0 682 341 A1 | 11/1995 | European Pat. Off. . |
| 0 762 407 A2 | 3/1997 | European Pat. Off. . |
| 0 818 782 A2 | 1/1998 | European Pat. Off. . |
| 8-273331 | 10/1996 | Japan . |
| 2 250 626 | 6/1992 | United Kingdom . |
| 2 277 827 | 11/1994 | United Kingdom . |
| WO 93/08565 | 4/1993 | WIPO . |
| WO 94/10684 | 5/1994 | WIPO . |
| WO 94 24665 | 10/1994 | WIPO . |

OTHER PUBLICATIONS

Halfhill, "CDs for the Gigabyte Era", *BYTE*, Oct., 1996, pp. 139–144.

Bell, "Next–Generation Compact Discs", *Scientific American*, Jul., 1996, pp. 42–46.

Hyon et al., "CD It For Yourself", *BYTE*, Jun., 1996, pp. 105–112.

*Primary Examiner*—Ali Neyzari
*Attorney, Agent, or Firm*—Eric D. Levinson

[57] ABSTRACT

A dual layer optical disc having images encoded therein. The dual layer optical disc includes a first data layer and a second data layer coupled to the first data layer. An optically viewable image is encoded within the first data layer or the second data layer. The viewable image may be a light contrast, medium contrast, or high contrast image. The first data layer and the second data layer may have a balanced reflectivity rating. In another embodiment, the first data layer and the second data layer have an unbalance reflectivity rating, for varying the visibility of images encoded therein. The dual layer optical disc may further include a second side, having a third data layer and a fourth data layer having an optically viewable image encoded within the third data layer or the fourth data layer. The optically viewable image may be a holographic image.

24 Claims, 8 Drawing Sheets

CUSTOMIZED GRAPHICS FOR DUAL LAYER OPTICAL DISCS

TECHNICAL FIELD

The present invention relates generally to optical discs. In particular, the present invention includes a dual layer optical disc having images within a diffraction pattern encoded in one or more layers in the disc.

BACKGROUND OF THE INVENTION

Optical discs, such as CD-ROM (Compact Disc-Read Only Memory) or DVD (Digital Versatile Disc or Digital Video Disc) media have data stored as a series of lower reflectance "pits" formed within a plane of higher reflectance "lands". The pits may be coated with the same material as the lands, but due to pit geometry, will diffract more light than the flatter lands, and therefore return less light to the reading sensor. The pits bottoms may be illuminated and read resembling bumps, which also diffract more light than the flatter lands. The pits are arranged in a spiral track originating at the disc center hub and ending at the disc outer rim. The data may be considered to lie in a series of tracks spaced radially from the center hub. Disc layers having no data thereon may contain a spiral groove or a series of concentric grooves, creating a diffraction pattern. Whether a spiral or a series of concentric grooves, the resulting grooves are substantially circular.

The track typically begins in a "pre-user data" area near the center hub. The pre-user area contains descriptor information of the disc itself. A "user-data" area follows the pre-user data area, and contains the data of the disc. A "lead-out" area follows the user-data area, lying closer to the outer edge of the disc. The lead-out area contains no user data, but may contain a pattern of pits which can be a repeating pattern or a random pattern having no data readout value or information content. The pre-user data area, user-data area, and lead-out area collectively comprise the "information area" of the disc.

The information content is encoded in the length of the slightly arcuate, circumferential pits. Microscopically, the track consists of a series of pits. When viewed with the naked eye, the aligned pits appear to form a continual groove, with the spiral groove forming a diffraction pattern. The diffraction pattern reflects light of varying colors, as described by Bragg's law.

In the lead-out area, the spiral track may be a continuous spiral groove, having a very long pit, formed not for information content but for appearance. Thus, while the optical disc may contain a spiral pattern to the outer rim, there may be very little user-data present, with the lead-out area comprising a majority of the disc surface in a sparsely populated disc. In even a fully populated disc, the lead-out area comprises a few millimeters near the outer rim.

A master optical disc is typically manufactured by coating a glass substrate with a positive photosensitive layer, followed by baking the coated substrate. A laser is thereafter used to expose portions of the photoresist in a spiral pattern of circumferential arcs of varying length, corresponding to the later formed pits. The master disc is thereafter developed, with the exposed areas being washed away, forming pits. The unexposed areas remain, forming a plane of higher "lands." As such, the master disc is said to be "pre-recorded" optical disc.

The master disc is used as a mold to form one or more harder, metallised, "stampers", having bumps corresponding to the pits in the master disc. The stampers are used to form the optical discs via injection molding, the final discs having pits corresponding to the bumps in the stampers corresponding to the pits in the master disc.

In CD-ROMs, the readable side includes a transparent polycarbonate bottom layer having the reflective layer thereover, which in turn has a protective "lacquer" layer thereover, which can include a label. The readable side is typically placed face down over a laser reader which penetrates the transparent layer to the single reflective layer having pits. As an example, in pre-recorded media, pits are formed in such a way to give a high contrast signal relative to the land.

DVDs are an optical disc having increased capacity relative to CD-ROMs. In one example, this is achieved in part by having double sided discs. Double sided DVDs have two reflective layers, each facing outward, requiring flipping the disc to read both sides or an additional device to read the second side. Double sided DVDs require each side to be transparent, and thus have a special labelling requirement, as covering one side with lacquer and label is no longer possible. Any label or image on the disc must be both visible, and transparent to a laser in the region containing data. Double sided discs consist of two single sided discs bonded back to back with an adhesive.

Another example of an optical disc having increased capacity relative to CD-ROMs is a dual layer disc. Dual layer discs include an innermost data layer having a reflective layer thereon, and an outermost data layer having a reflective layer thereon. The outermost reflective layer is sometimes referred to as the "semi-reflective layer" and the innermost reflective layer as the "fully reflective layer". The outermost reflective layer has optically readable differences in reflectivity between lands and pits, yet being sufficiently transparent to allow reading of the innermost reflective layer below. The desired innermost or outermost layer is optically read by focusing the optical disc reader at the proper depth for the layer of interest. For increased optical disc capacity, dual layer optical discs may also be double sided. A double-sided, dual layer optical disc includes two optically readable layers on each side of the disc.

Labelling of the previously described optical discs is important. Labelling can operate as a deterrent to piracy. The data on optical discs, being digital, can be read perfectly, and reproduced perfectly, in unlimited quantities. Standard labels on the lacquer side of CD-ROMs can also easily be reproduced, using techniques similar to those used to produce the original labels. Labelling requiring the creation of art-work on the master discs or stampers themselves would require significantly more effort and/or specialized equipment to produce copies capable of passing as the original discs.

One known method of labeling optical discs is described in U.S. Pat. No. 5,607,188, issued Mar. 4, 1997, entitled "Marking of Optical Disc for Customized Identification", the entire content of which is herein incorporated by reference. U.S. Pat. No. 5,607,188 has a common inventor and the same assignee as the present application. The above referenced application includes an optical disc which is labeled by incorporating a low contrast image, such as a "watermark", into the optical disc substrate. The image is a low contrast image which is located in the user-data area of the disc and includes optically readable data encoded therein.

It would be desirable to mark a dual sided disc in a way that would identify a disc as being authentic, that is, as having been manufactured by an authorized source. It is desirable to have a dual layer optical disc with images on one layer but not another. Further, it is desirable to have a dual layer optical disc having an image front visible on one side with the image back visible on the other side. Finally, it is desirable to create images for dual layer discs at the master disc level.

SUMMARY OF THE INVENTION

The present invention is a dual layer optical disc having optically viewable images encoded on selected layers of the disc. The invention may include a double sided disc, where each side can have images encoded therein.

In one embodiment, the present invention includes a dual layer optical disc having images encoded therein. The dual layer optical disc includes a first data layer and a second data layer coupled to the first data layer. An optically viewable image is encoded within the first data layer. Further, a second optically viewable image may be encoded within the second data layer.

The first data layer, having an optically viewable image therein, may include a data region and an image region, each region having a plurality of lands and pits. The lands in the image region may have a height less than the height of the lands located within the data region relative to the pits. The dual layer optical disc may further include optically readable data encoded within the second layer and/or first layer.

The optically viewable image may be a light contrast image, a medium contrast image, or heavy contrast image. If the optically viewable image is a light contrast image, the optically viewable image may further include optically readable data encoded therein. The optically viewable image may be a holographic image.

The first data layer and the second data layer may have a balanced reflectivity value. In another application, the first data layer and the second data layer may have an unbalanced reflectivity value. In one preferred embodiment, the first data layer is semi-reflective and the second data layer is reflective.

The dual layer optical disc may further include a second side, having a third data layer and a fourth data layer. The third data layer or the fourth data layer may also include an optically viewable image encoded therein.

In another embodiment, the present invention includes a dual layer optical disc having an image encoded therein. The dual layer optical disc includes a first protective layer and a first layer, the first layer including a first data layer having a first reflective layer formed thereover. A second layer is interposed between the first protective layer and the first layer, including a second data layer having a second reflective layer formed thereover. An optically viewable image may be encoded within the first layer or the second layer.

The first layer and the second layer may have a balanced reflectivity value. In another application, the first layer and the second layer may have an unbalanced reflectivity value. In one embodiment, the first reflective layer is semi-reflective and the second reflective layer is reflective.

The dual layer optical disc in accordance with the present invention may further include a third layer including a third data layer having a third reflective layer formed thereover, wherein the first protective layer is formed of an adhesive and couples the second layer to the third layer. An optically viewable image may be encoded within the third layer. Further, a fourth layer may be coupled to the third layer, the fourth layer including a fourth data layer having a fourth reflective layer formed thereover.

DETAILED DESCRIPTION OF THE PREFERRED EMBODIMENTS

Although specific dual-layer optical discs are used in the exemplary embodiments described herein, it is recognized that the field to which this invention pertains includes all types of dual-layer optical data discs having information contained in data structures therein as data features. In various formats of optical data discs, the data features may include data pits, grooves, bumps or ridges, and lands or land areas. This includes current formats of dual layer DVD, as well as future formats which use data features described herein.

Figure 1:
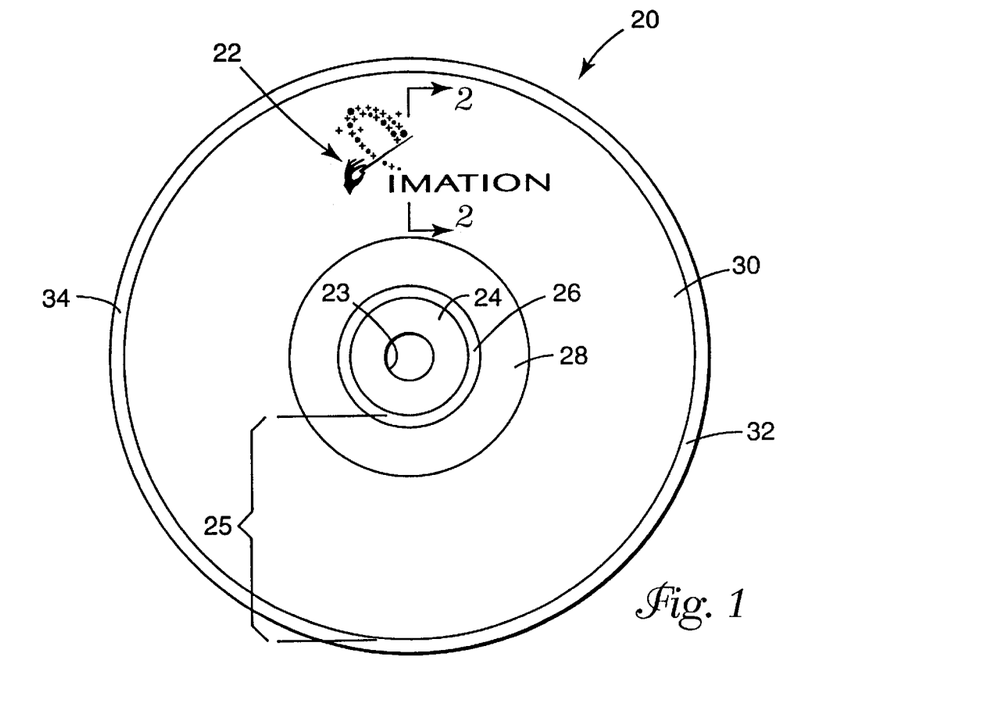
FIG. 1 is a top view of a dual layer optical disc having an image encoded therein in accordance with the present invention.

FIG. 1 illustrates a readable side of a dual layer optical disc 20 having an image 22 located therein, in accordance with the present invention. Although the Imation logo is shown, it is recognized that most any image or character may be produced within the disc substrates. The side shown is capable of being illuminated and read by an optical disc laser or reader. Disc 20 is a dual layer optical disc, such as a dual layered DVD optical disc. The opposite side (not shown in FIG. 1) may be either an opaque, labeled, non-read side, or a second, readable side which also may be dual layered. Disc 20 includes an inner rim 23, an inner annular ring 24, an information area 25, an outer annular ring 32, and an outer rim 34.

Although only the top layer of the dual layer optical disc 20 is shown, each layer may include an information area 25. The information area 25 is defined as the area on the disc 20 capable of containing user data. In one embodiment, the information area 25 includes a pre-user area 26, a user-data area 28, and a lead-out area 30. The pre-user area 26 typically contains information about the disc contents, such as descriptive information. The user-data area 28 contains the user accessible contents of the disc. The lead-out area 30 typically appears as a spiral track similar to that in the user-data area, but may contain no information readable by an optical disc player.

The information area 25 is the area available for information storage, even though much of it may be taken up with the lead-out area 30 when the disc has little user-data encoded. On one of the layers, the information area 25 contains image 22, such as the Imation logo shown consisting of a design and alphanumeric characters. As shown, the image 22 is located in the lead-out area 30 of the information area 25.

In one application, each layer of the dual layer disc has a pre-user data area 26, a user-data area 28 and a lead-out area 30. When the disc 20 is read by an optical disc player, the disc reader begins reading the first layer pre-user data area 26, then reads the user-data area 28, and then travels from the lead-out area 30 to the second layer pre-user data area 26, and then reads the user-data area 28 of the second layer. In another application, the first layer has a pre-user data area 26 and a user-data area 28, and the second layer has a user-data area 28 and a lead-out area 30. In this application, the optical disc reader reads the first layer pre-user data area 26 and the user-data area 28, and then continues to the second layer and reads the user-data area 28 and ends at the lead-out area 30.

FIGS. 2–17 illustrate different embodiments of a dual layer disc in accordance with the present invention having an image contained (encoded) on one of the layers therein. Each of these embodiments will be discussed in detail in the following paragraphs.

Figure 2:
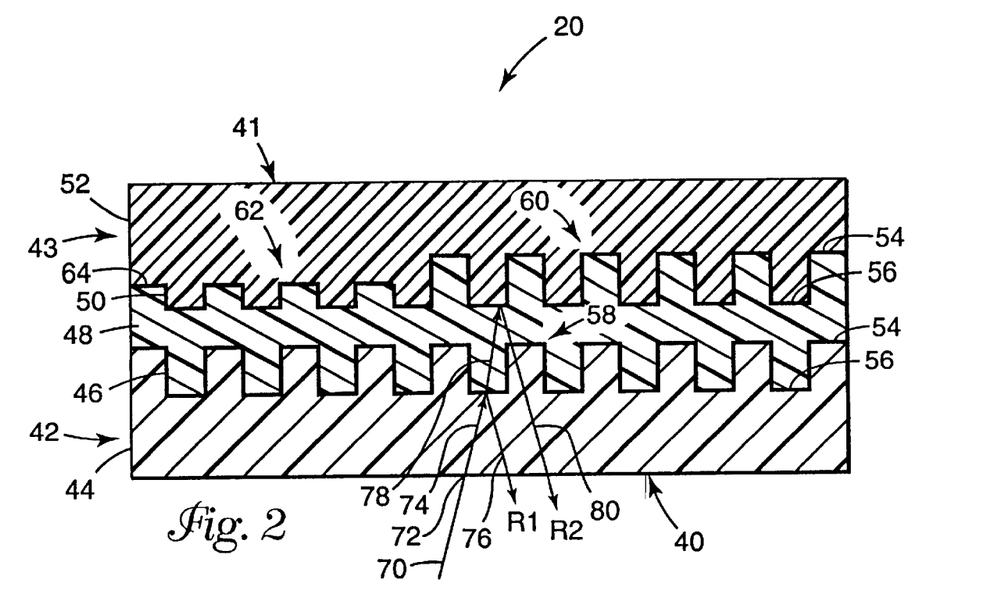
FIG. 2 is a partial cross-sectional view taken along line 2—2 of FIG. 1, showing one embodiment of the dual layer optical disc in accordance with the present invention.

In FIG. 2, a partial cross-sectional view of one embodiment of the optical disc 20 (including image 22) in accordance with the present invention is shown. In the exemplary embodiment shown, disc 20 is a single-sided dual layer optical disc.

Dual layer optical disc 20 includes a read side 40 and a non-read side 41. Starting at read side 40, the optical disc 20 further includes a first layer 42 having a first data layer 44 and a first reflective layer 46, and a second layer 43 having a second data layer (or spacer layer) 48 and a second reflective layer 50, and a protective layer 52. The first reflective layer 46 is interposed between the first data layer 44 and the second data layer 48, and the second reflective layer 50 is interposed between the second data layer 48 and the protective layer 52.

The first data layer 44 and the second data layer 48 are generally transparent and include a series of lands 54 and pits 56. In one embodiment, the first data layer 44 and the second data layer 48 are formed of a generally clear material. In one exemplary embodiment, the first data layer 44 may be formed of a substantially clear polycarbonate and the second data layer 48 may be formed of a substantially clear photopolymer. The first reflective layer 46 and the second reflective layer 50 are formed of a reflective material, such as aluminum, gold, or a dielectric, such as is described in U.S. Pat. No. 5,540,966, entitled "Dual Layer Optical Medium Having Partially Reflecting Thin Film Layer", issued Jul. 30, 1996, the entire content of which is herein incorporated by reference, having varied degrees of reflectivity, as will be described in detail later herein. The protective layer 52 may be formed of a protective material, such as lacquer, which may be opaque or clear. If the lacquer is clear, and no label is contained on non-read side 42, the reverse of image 22 may be viewed through the non-read side 42.

In the embodiment shown, the first layer 42 has data encoded therein, indicated by data region 58. The second layer 43 may also have data encoded therein, indicated by data region 60, but also includes image region 62. Specifically, in first layer 42, the data region 54 includes a series of full height lands 54 and pits 56. Similarly, within data region 56 located on second data layer 48, the data region 56 includes full height lands 54 and pits 56. Within image region 62, the lands are reduced height lands 64. If a reference plane were drawn through the bottom of the pit 56, the reduced height lands 64 appear reduced in height relative to full height lands 54. Reducing the difference in the height between reduced height lands 64 and full height lands 54, disturbs the periodic diffraction grating within image region 62, creating optically viewable image 22.

The reduced height lands 64 within image region 62 produce a contrast in the diffraction grating between the image region 62 and the data region 60. The contrast in the diffraction grating within image region 62 results in a viewable image within the disc substrate, such as image 22.

The image 22 can be a low contrast, medium contrast, or high contrast image. Whether the image 22 is a low contrast, medium contrast or high contrast image depends greatly upon the height of the reduced height lands 64 within image region 62 relative to the level of the pits 56 and the (full height) lands 54 within data region 58, and the reflectivity values of each layer (42 and 48).

For light contrast images, reduced height lands 64 are shorter than lands 54, relative to the bottom of pits 56, being reduced sufficient enough to create a viewable image, but not sufficient to destroy optical readability. Therefore, a light contrast image may be located within image region 62 using reduced height lands 64, yet reduced height lands 64 have a height sufficient to contain encoded data which is readable by an optical disc reader.

For heavy contrast images within image region 62, the lands are substantially or totally removed to the level of the bottom of the pits 56. The resulting difference in the diffraction pattern between image region 62 and data region 60 is a high contrast image located in image region 62. When reduced height lands 64 are totally obliterated or substantially removed to form a high contrast image, no data may be encoded within the image region 62 which could be readable by an optical disc reader. As such, image region 62 can be said to be optically viewable, but not optically readable.

A medium contrast image is produced using reduced height lands 64 having a medium height (as shown in FIG. 2) within image region 62. A medium height land is a land having a height which can be defined within the range between where the height of the land is such that the image region 62 may be no longer readable by an optical disc reader when data is encoded therein, down to the point where the lands are substantially or completely removed or obliterated. The resulting difference in diffraction pattern between the image region 62 and data region 60 is a medium contrast image relative to the previously defined light contrast and heavy contrast images.

In one application of the above embodiment, data may be encoded within first layer 42 and images may be encoded in second layer 43. In this application, the images on second layer 43 may be light contrast, medium contrast or heavy contrast images. In another application, data may be encoded within first layer 42, and data may also be encoded within data region 60 of second layer 43, with light contrast, medium contrast or heavy contrast images encoded within image region 62. If the images encoded within image region 62 are light contrast images due to the height of the reduced height lands 64, then data may also be encoded within image region 62 which is not only optically viewable, but optically readable by an optical disc reader.

Optical disc 20 has an effective reflectivity value, substantially caused by the reflectivity of first reflective layer 46 and second reflective layer 50, but also affected by the reflectivities and losses caused by the passage of light through the various substrates, including first data layer 44 and second data layer 48. First layer 42 has an effective reflectivity, indicated as R1, which is defined by the fraction or intensity of incident light that is reflected by first reflective layer 46 to a receiver (not shown) outside of first read side 40. The second reflective layer 50 has an effective reflectivity, indicated by R2, which may be defined as the fraction of incident light that is reflected by the second reflective layer 50 to a receiver (not shown) outside of first read side 40. As previously stated, the effective reflectivity values R1 and R2 are also affected by the various substrates which they pass through.

In FIG. 2, one exemplary embodiment of the attenuation of light (or signal) caused by first layer 42 and second layer 43 is shown. Incident light (70) enters first data layer 44, becoming attenuated (at 72) by surface reflection (not shown) at first data layer 44. The light is further attenuated as it passes through first data layer 44, and is reflected on first reflective layer 46 (74). The light reflected by the first reflective layer 46 again exits the first data layer 44 (76), which has been previously referred to as R1. Light which is focused on the second reflective layer 50, after passage through the first reflective layer 46, passes through second data layer 48 (78), is reflected at second reflective layer 50, and again passes back through second data layer 48, first reflective layer 46, first data layer 44 (80), and exits the first data layer 44, indicated as R2.

The effective reflectivity of the first layer 42 and the second layer 43 (and resulting R1 and R2) may be balanced or unbalanced. In a balanced application, R1 is equal to R2. Reflectance of the disc 20 materials are selected such that the resulting signal effective reflectivity value (or signal strength) of R1 is equal to R2. In an unbalanced application, R1 is greater than R2 or R2 is greater than R1. An unbalanced effective reflectivity value may be desirable when other factors are considered, such as the desired visibility of an image encoded within one of the layers.

In one exemplary embodiment having balanced reflectivity, where R1 is substantially equal to R2, the first reflective layer 46 is "semi-reflective" being formed of a metal or dielectric, such as those previously described herein, having a reflectivity rating in the range of 25 percent to 40 percent. The second reflective layer 50 is reflective, and may also be formed of a metal or dielectric having a greater reflectivity than first reflective layer 46. In one embodiment, the reflective layer 50 may have a reflectivity rating of 70 percent or greater and may be aluminum.

In another embodiment, the effective reflectivity value of the first layer 42 is not equal to the effective reflectivity value of the second layer 43 (for example, R1 is not equal to R2). In one preferred embodiment, the effective reflectivity value of the first reflective layer 46 is less than the effective reflectivity value of the second reflective layer 50, resulting in R1 less than R2. For example, the ratio of R2 to R1 may be two to one or ten to one. It is also recognized that R1 may be greater than R2.

The effective reflectivity value of first layer R1 relative to second layer R2 may be varied to make images contained/encoded in one layer more visible or viewable than the other layer. For example, in the exemplary embodiment shown, data is encoded in first layer 42 and image 22 is encoded within second layer 43. First data layer 44, second data layer 48, and protective layer 52 are substantially clear. First reflective layer 46 is less reflective than second reflective layer 50, and in combination with other disc materials, results in an unbalanced reflectivity of R1 less than R2.

Figure 3:
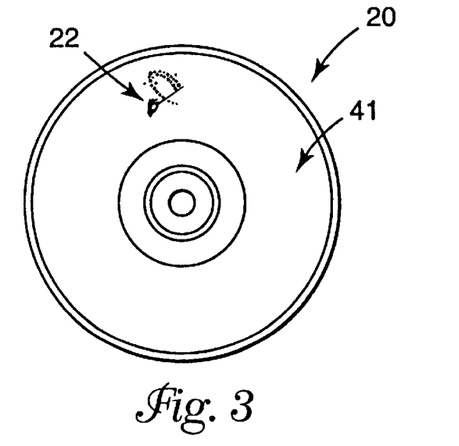
FIG. 3 is a plan view of the optical disc of the embodiment of FIG. 2, as viewed from the non-read side.
Figure 4:
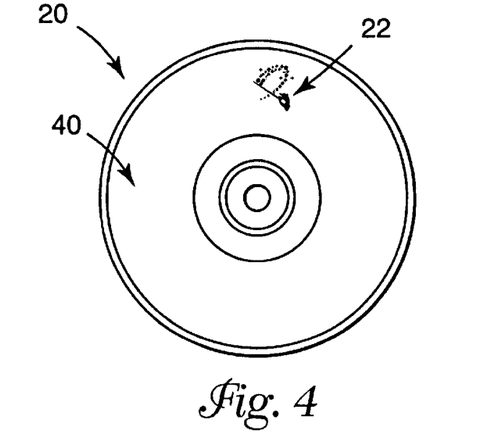
FIG. 4 is a plan view of the optical disc of FIG. 2, as viewed from the read side.

FIG. 3 is a plan view of optical disc 20 when viewed from the non-read side 41. Since protective layer 52 is substantially clear, image 22 may be viewed from the non-read side. In reference to FIG. 4, a plan view of the optical disc 20 is shown, as viewed from the read side 40. Since the effective reflectivity value of first layer 42 (R1) is less than the effective reflectivity value of second layer 43 (R2), the image 22 may also be viewed from the read side 40. The diffraction grating contrast of image 22 when viewed from read side 40 is dependent upon the height of reduced height land 64, as previously described herein, and is further dependent upon the difference in the reflectivity of the first layer 42 and the second layer 43.

Figure 5:
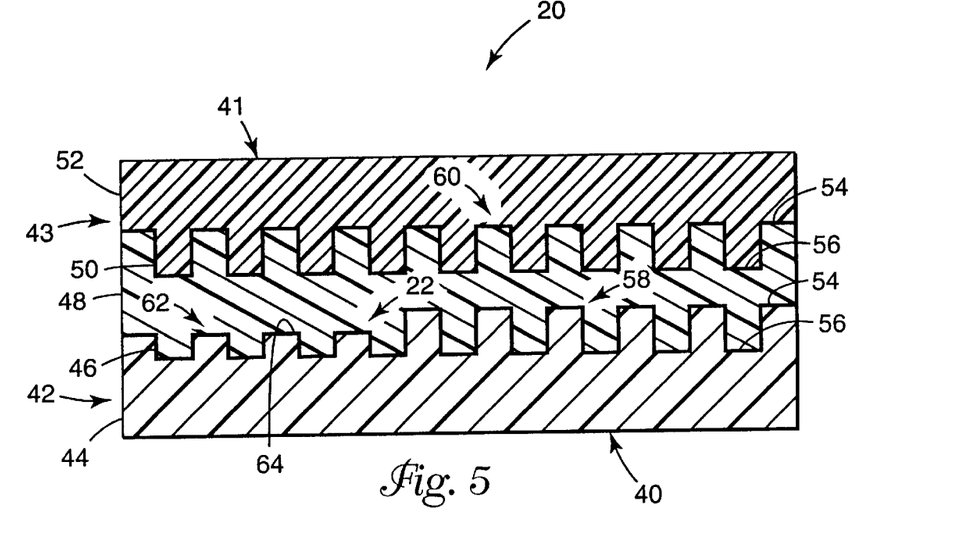
FIG. 5 is a partial cross-sectional view of another embodiment of the dual layer optical disc in accordance with the present invention.

In FIG. 5, a partial cross-sectional view of another embodiment of dual layer optical disc 20 in accordance with the present invention is shown. First layer 42 includes data region 58 and image region 62, having reduced height lands 64 for producing image 22. Second layer 43 includes data region 60 having data encoded therein. Similar to the previous embodiment, the first data layer 44, the second data layer 48, and the protective layer 52 are substantially clear. Further, the first layer 42 and the second layer 43 have an unbalanced reflectivity rating, wherein the first reflective layer 46 is less reflective than the second reflective layer 50.

Figure 6:
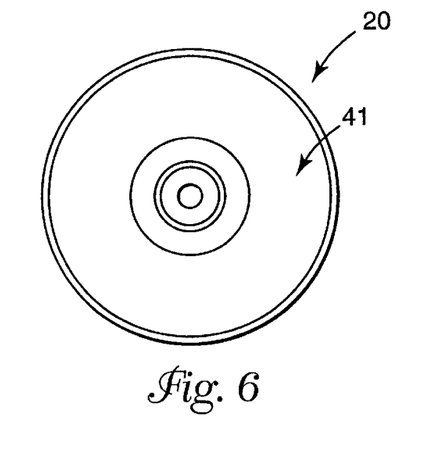
FIG. 6 is a plan view of the optical disc of FIG. 5, as viewed from the non-read side.
Figure 7:
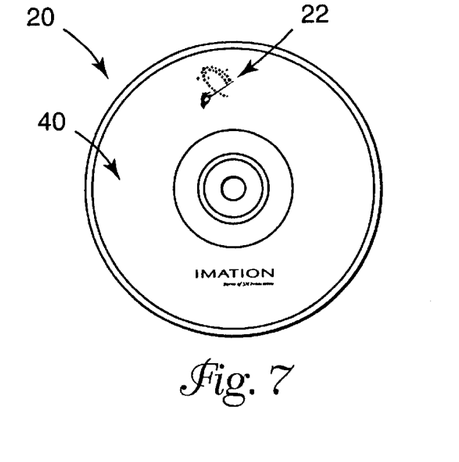
FIG. 7 is a plan view of the optical disc of FIG. 5, as viewed from the read side.

In FIG. 6, a plan view of dual layer optical disc 20 is shown as viewed from the non-read side 41. It is noted that since image 22 is contained within first layer 42, and the first reflective layer 46 is semi-reflective and the second reflective layer 50 is reflective, no change in diffraction grating is visible from the non-read side 41 and image 22 is not viewed. In FIG. 7, a plan view of dual layer optical disc 20 is shown as viewed from the read side. Image 22 located within first layer 42 is visible from the read side 40.

Figure 8:
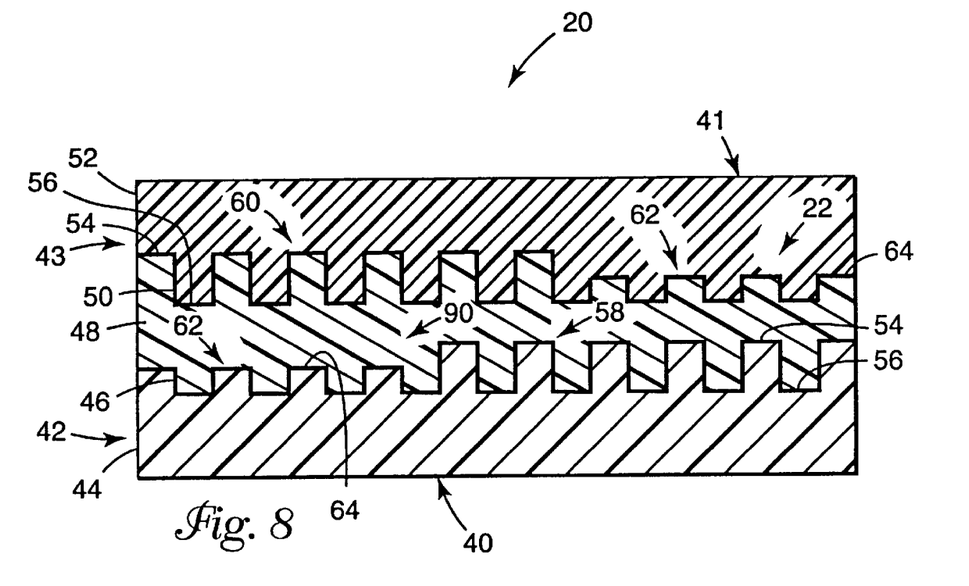
FIG. 8 is a partial cross-sectional view of another embodiment of a dual-layer optical disc in accordance with the present invention.

In FIG. 8, a partial cross-sectional view of another embodiment of the dual layer optical disc 20 in accordance with the present invention is shown. In this embodiment, both first layer 42 and second layer 43 include visible (optically viewable) images thereon. Specifically, second layer 43 includes reduced height lands 64 in image region 62 to disturb the periodic diffraction grating, creating the optically viewable image 22. First layer 42 includes reduced height lands 64 within image region 62 to disturb the periodic diffraction grating, creating the optically viewable alphanumeric image 90. As previously described herein, if image 22 or image 90 are a light contrast image resulting from the height of reduced height lands 64, optically readable data may also be encoded therein.

Similar to the previous embodiments, first data layer 44, second data layer 48 and protective layer 52 are substantially clear. Further, the effective reflectivity of first layer 42 and second layer 43 is "unbalanced". Specifically, first layer 42 is semi-reflective and second layer 43 is reflective.

Figure 9:
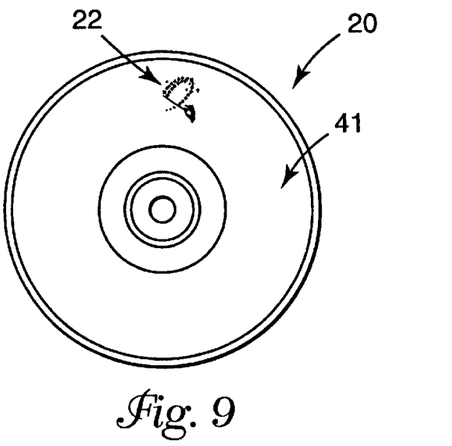
FIG. 9 is a plan view of the optical disc of FIG. 8, as viewed from the non-read side.
Figure 10:
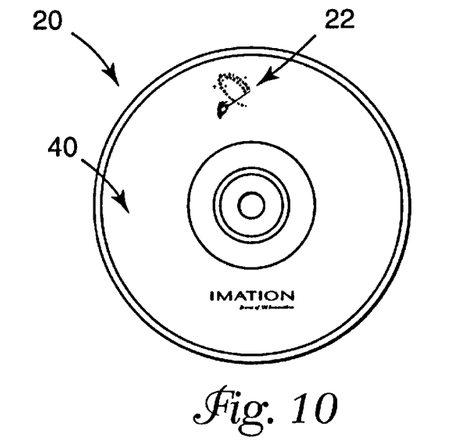
FIG. 10 is a plan view of the optical disc of FIG. 8, as viewed from the read side.

In FIG. 9, a plan view of dual layer optical disc 20 is shown as viewed from non-read side 41. Since second layer 43 is reflective, only image 22 contained in second layer 43 is visible from the non-read side 41. In FIG. 10, a plan view of optical disc 20 is shown as viewed from the read side. In this view, alphanumeric image 90 contained within first layer 42 is visible. Further, since first layer 42 is semi-reflective and second layer 43 is reflective, the reverse of image 22 is also visible from the read side 40.

Figure 11:
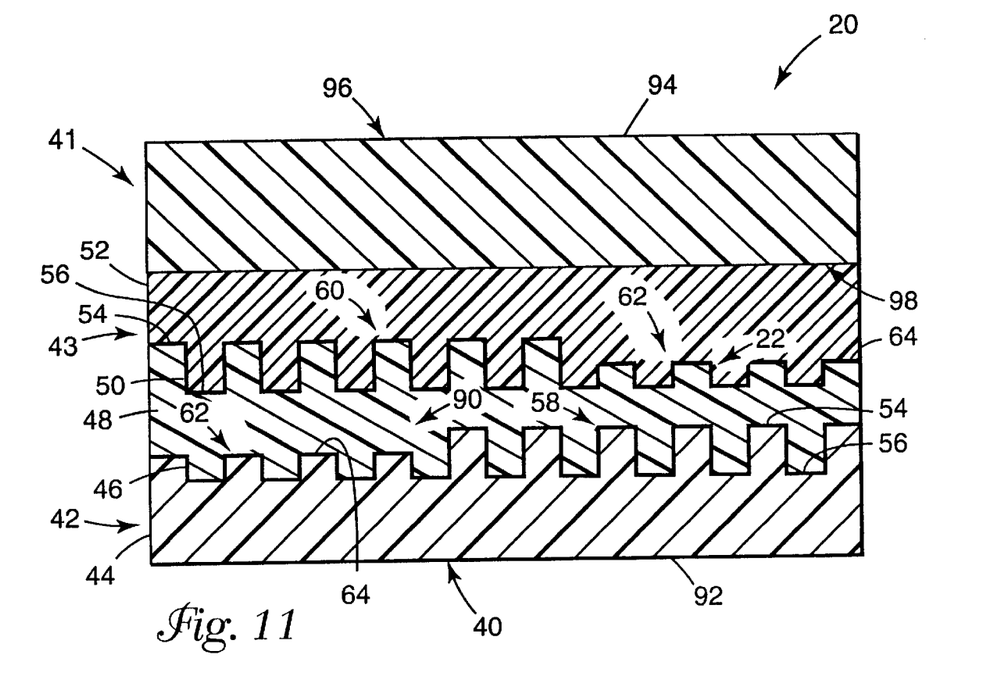
FIG. 11 is a partial cross-sectional view of another embodiment of a dual-layer optical disc in accordance with the present invention.

In FIG. 11, a partial cross-sectional view of another embodiment of the dual layer optical disc 20 in accordance with the present invention is generally shown, wherein the dual layer optical disc 20 is a double sided optical disc. Optical disc 20 includes first side 92, as previously described in detail in the embodiment of FIG. 8, and also includes a second side 94. Second side 94 includes a read side 96 and a non-read side 98. In the embodiment shown, second side 94 merely consists of a substrate formed of a material which can be similar to first data 44, such as a polycarbonate. The first side non-read side 41 is securely coupled to the second side non-read side 98 using protective layer (or coating) 52, which in this embodiment is preferably a clear adhesive.

Figure 12:
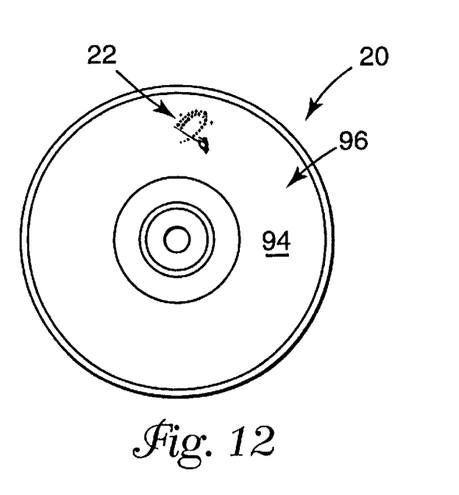
FIG. 12 is a plan view of the optical disc of FIG. 11, as viewed from the second side.
Figure 13:
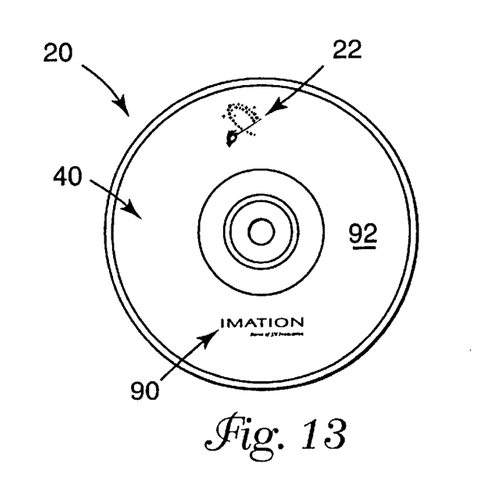
FIG. 13 is a plan view of the optical disc of FIG. 11, as viewed from the first side.

In FIG. 12, a plan view of optical disc 20 is shown as viewed from the second side 94 read side 96. Similar to FIG. 9, only the diffraction grating resulting in image 22 is visible therein. In FIG. 13, a plan view of optical disc 20 is shown as viewed from the first side read side 40. Similar to FIG. 10, both the image 22 and the alphanumeric image 90 are visible therein.

Figure 14:
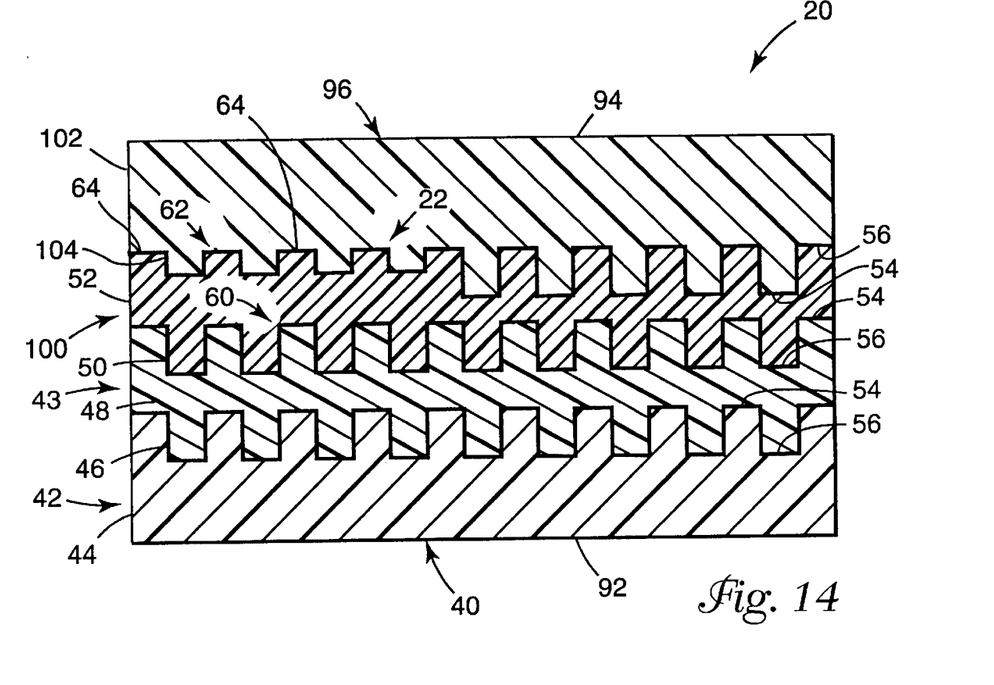
FIG. 14 is a partial cross-sectional view of another embodiment of a dual-layer optical disc in accordance with the present invention.

In FIG. 14, a partial cross-sectional view of another embodiment of the dual layer optical disc 20 is shown, wherein the dual layer optical disc 20 is a double sided optical disc. In this embodiment, first side 92 can be similar to the dual layer optical disc 20 as previously described herein. Second side 94 has an image 22 encoded therein.

In particular, second side 94 further includes a third layer 100, including a third data substrate 102 and a third reflective layer 104. The third data substrate 102 and third reflective layer 104 may be formed of materials as previously described herein for first side 92. The first side 92 is coupled to second side 94 at protective layer 52, which may be an opaque adhesive.

Figure 15:
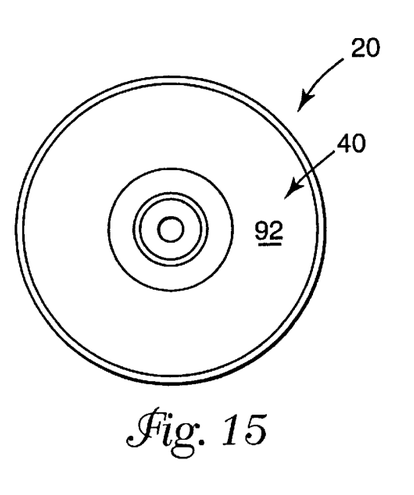
FIG. 15 is a plan view of the optical disc of FIG. 14, as viewed from the first side.
Figure 16:
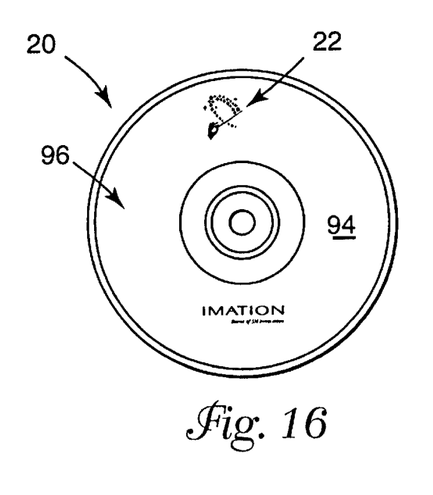
FIG. 16 is a plan view of the optical disc of FIG. 14, as viewed from the second side.

In FIG. 15, a plan view of optical disc 20 is shown as viewed from first side 92 read side 40. In this embodiment, image 22 is not visible from first side 92 read side 40. In FIG. 16, a plan view of optical disc 20 is shown as viewed from second side read side 96. As shown, the contrast in the diffraction grating between image region 62 and data region 106, results in an optically viewable image 22.

In one application, the embodiment of FIG. 14 is a DVD optical disc. First side 92 functions as a data side having optically readable data encoded within first layer 42 and second layer 43. Second side 94 operates as a label side, having image 22 in the form of a disc content label.

Figure 17:
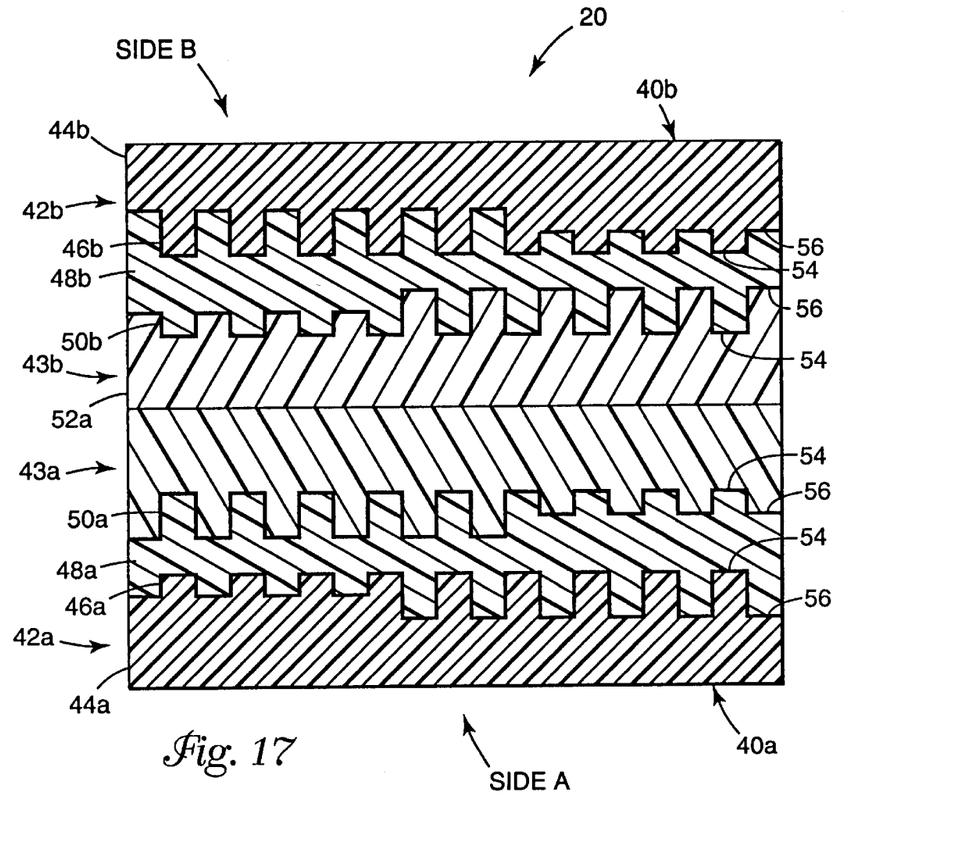
FIG. 17 is a partial cross-sectional view of another embodiment of a dual-layer optical disc in accordance with the present invention.

In FIG. 17, a partial cross-sectional view of another embodiment of the optical disc 20 in accordance with the present invention is shown, wherein the optical disc 20 is a dual layer double-sided disc, wherein each side includes a dual layer. As shown, the optical disc 20 includes side A and side B, wherein each side includes images and data encoded within a layer therein.

Each side, side A and side B, can be similar to any of the dual layer optical disc embodiments as previously described herein. In the embodiment shown, side A and side B are each similar to the embodiment of FIG. 8, having both data and images encoded within each layer therein. The dual layer dual-sided optical disc 20 is formed by coupling two dual layer optical discs together, back to back, with an opaque adhesive 52.

Figure 18:
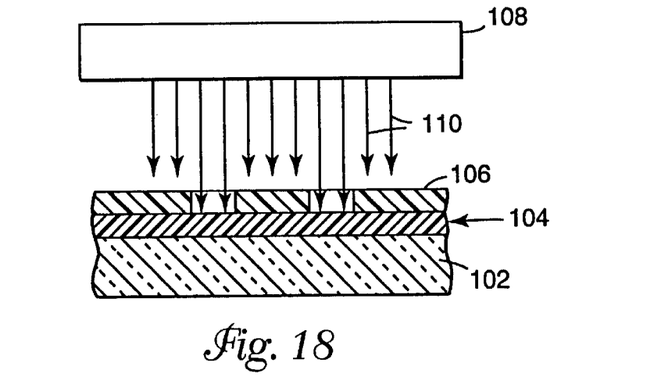
FIG. 18 is a diagram illustrating a method of creating a master disc for creating a dual layer optical disc in accordance with the present invention.

In FIG. 18, a process of creating a master disc 100 for use in creating a dual layer optical disc 20 in accordance with the present invention is shown. The process includes providing a substrate 102 coated with a photosensitive layer 104. The photosensitive layer 104 may be secured to the substrate 102 using an adhesive (not shown). The photosensitive layer 104 is responsive to a light source. In one embodiment, the substrate 102 is formed of quartz or glass and the photosensitive layer 104 is formed of photoresist.

A mask 106 is placed over and parallel to the plane of the photosensitive layer 104. In one embodiment, the mask 106 may include a chrome pattern on a glass substrate. The glass substrate has an absence of chrome corresponding to the desired pattern. In a preferred embodiment, the mask 106 is a diffraction mask having an image pattern located therein to create a diffraction pattern disturbed in image regions within the photosensitive layer 104.

A light source 108 is used for transferring the mask 106 pattern to the master disc 100. In one embodiment, the light source 108 is a UV light source. The pattern mask 106 is positioned between the master disc 100 and the light source 108. In operation, the light source 108 emitting light 110 is placed over the pattern mask 106, and photosensitive layer 104 is exposed to the light 110 for a period of time sufficient to create the desired reaction. The amount of exposure reaction is dependent upon the light source intensity and the duration of the exposure of the photosensitive layer 104 to the light source 108.

In one preferred embodiment, the master disc 100 is a pre-recorded master, meaning it has user-data already encoded on the disc. In one method, the master disc 100 is pre-recorded using a laser beam writer to record data by exposing photoresist in regions corresponding to future data pits as is well known in the art. Upon further exposure of master disc 100 in accordance with the present invention, both user-data, diffraction patterns and images may be developed in a development step.

It is also recognized that master disc 100 may not be previously recorded, and may have pre-user data and user-data portions encoded using a mask similar to mask 106, but encoding data pits in addition to the diffraction pattern. In this embodiment, a laser beam is not required to either write data or form images on the disc.

It is also recognized that a laser beam may be used for recording images within the photosensitive layer 104 by exposing the photosensitive layer 104 in regions corresponding to the image regions. If a laser beam writer is utilized, the light source 108 and mask 106 are not necessary for forming images within photosensitive layer 104.

Figure 19:
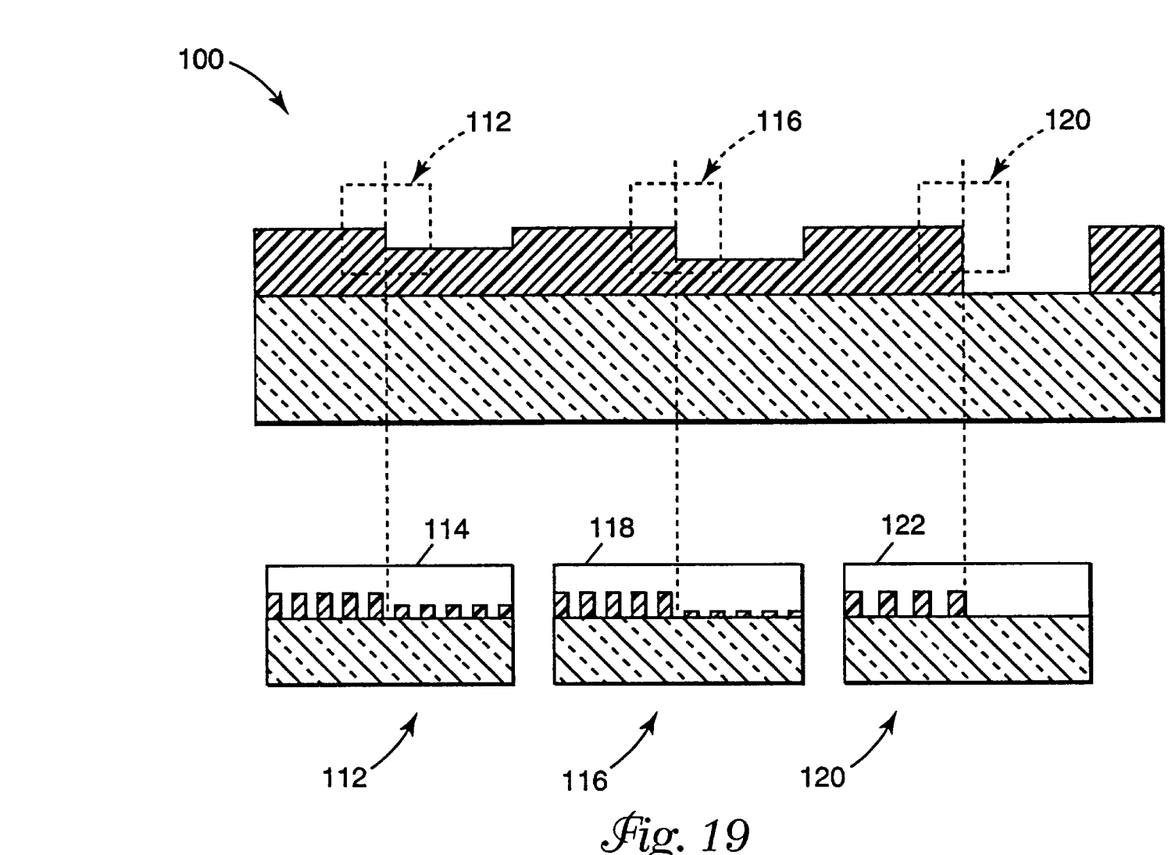
FIG. 19 is a partial cross-sectional view of a master disc in accordance with the present invention after development of low, medium, and high contrast image regions.

Referring to FIG. 19, the result of light, medium and heavy exposure of photosensitive layer 64 is illustrated. At 112, light exposure region 114 is shown, which would correspond to a light contrast image being formed within one layer of optical disc 20. At 116, a medium exposure is shown, resulting in a medium contrast image in optical disc 20. At 120, a heavy exposure is shown, resulting in a heavy contrast image viewable within optical disc 20.

The master disc 100 is used to form a metallized stamper to form a single layer of the dual layer disc in a disc molding process. The stamper will have ridges or stamper bumps corresponding to the pits within master 100. The stamper will be used to produce replica discs in an injection molding process.

Once a replica disc of the first layer is formed, the replica disc may be used for making single sided dual layered discs or dual sided dual layered discs, such as shown in FIGS. 1–17. For example, in one embodiment, to form the dual layer side of a disc, the first reflective layer 46 is deposited on the first data layer 44 to form first layer 42. The first layer 42 is coated with an embossable material, such as a photopolymer, and the data regions or image regions of the second data layer 48 are embossed within the embossable material. A second reflective layer 50 is deposited on the second data layer 48 to form the second layer 43. For a single sided disc, the second layer 43 is then covered with a protective layer 52, such as lacquer.

In another embodiment, once a replica disc of the first layer 42 is formed using the above-described disc molding process, a similar process is used for forming a second molded layer containing the second data layer 48 therein. A first reflective layer 46 is deposited on the first data layer 44, and a second reflective layer 50 is deposited on a second molded data layer. The first molded layer 42 and the second molded layer are secured together using a clear adhesive layer, which becomes the second data or spacer layer 48. For forming double-sided discs, individual dual layer discs or a dual layer disc and a single layer disc are coupled back to back using an adhesive, as previously indicated herein.

It is also recognized that the image encoded within one of the layers of the dual layer disc may be a holographic image. The holographic image may be formed in a master disc for creating a dual layer disc using methods as disclosed in U.S. Pat. No. 5,607,188, previously incorporated herein by reference. In one exemplary embodiment, a holographic image is produced in a layer of a dual layer optical disc, as previously described herein, using a coherent light source and a phase altering mask. In particular, in reference to FIG. 18, the light source 108 is a coherent light source, such as a laser light. Mask 106 is a phase altering mask such as a holographic thin film phase grating. When laser light 110 passes through the phase altering mask 106, a hologram is formed on the master disc 100 when light from the phase altering mask 106 is interfered with non-defracted light that passes through the phase altering mask 106. The master disc 100 is developed and processed using methods as previously described herein, and contains a holographic image therein.

Figure 20:
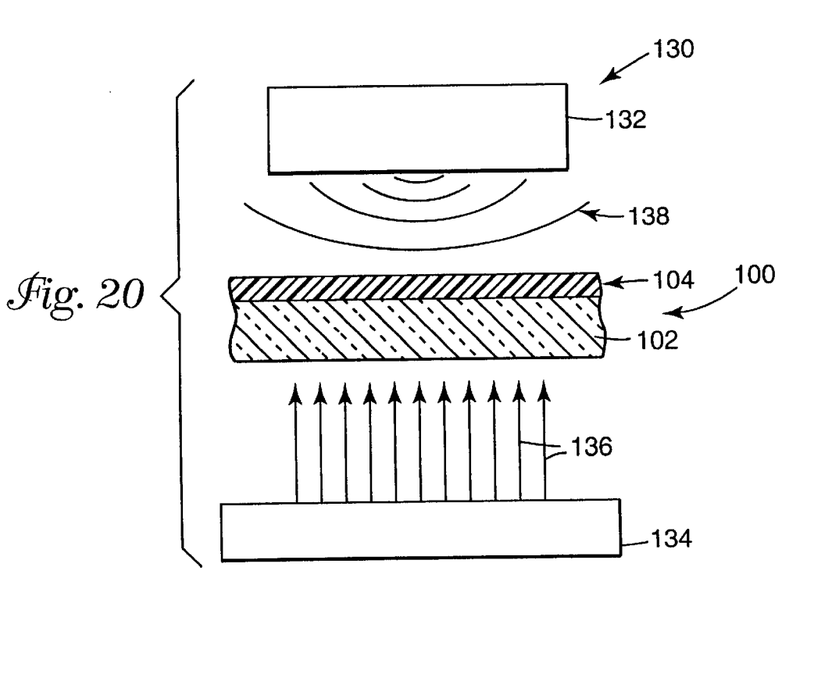
FIG. 20 is a diagram illustrating another method of creating a master disc for creating a dual layer optical disc in accordance with the present invention.

In another exemplary embodiment shown in FIG. 20, a reflective object 130 is used to form the holographic image in the master disc 100. In one embodiment, a reflective hologram 132, such as a Denisyuk hologram, is placed adjacent the master 100 (containing photoresist layer 104 over substrate 102) with the reflective side of the reflective hologram facing the photoresist layer 104. A coherent light source 134 such as a laser light is passed through the master 102 from the side opposite the photoresist layer 104. Laser light (indicated at 136) which passes through the master disc 100 will interfere with light reflected from the hologram 132 (indicated at 138), which will duplicate the reflective hologram on the master disc 100 (photosensitive layer 106). The master disc 100 is then developed as previously described herein, and contains a holographic image therein. The master disc 100 is used for making a dual layer optical disc with a holographic image encoded in at least one of the layers therein, as shown in the embodiments of FIGS. 1–17. Alternatively, it is also recognized that instead of using a reflective hologram, any reflective object may be positioned adjacent the master disc 100 photosensitive layer 106 such that the light reflected from the object will duplicate the reflective hologram onto the master disc 100.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed:

1. A dual layer optical disc having images encoded therein, the dual layer optical disc comprising:
   a first data layer including a first reflective layer;
   a second data layer including a second reflective layer, the second data layer coupled to the first data layer wherein the first data layer has a first effective reflectivity value, and the second data layer has a second effective reflectivity value; and
   an optically viewable image encoded within the first data layer, wherein the first data layer having the optically viewable image encoded therein includes a data region and an image region, each having a plurality of lands and pits, wherein the optically viewable image encoded therein is defined by the lands in the image region have a height less than the height of the lands located within the data region relative to the pits.

2. The dual layer optical disc of claim 1, further comprising a second optically viewable image encoded within the second data layer.

3. The dual layer optical disc of claim 1, further comprising optically readable data encoded within the second data layer.

4. The dual layer optical disc of claim 1, further comprising optically readable data encoded within the first data layer.

5. The dual layer optical disc of claim 1, wherein the optically viewable image is a light contrast image having optically readable data encoded therein.

6. The dual layer optical disc of claim 1, wherein the first layer is semi-reflective, and the second data layer is reflective.

7. The dual layer optical disc of claim 1, wherein the first reflectivity value is substantially equal to the second reflectivity value.

8. The dual layer optical disc of claim 1, wherein the first effective reflectivity value is not substantially equal to the second effective reflectivity value.

9. The dual layer optical disc of claim 1, further comprising a protective layer coupled to the second data layer.

10. The dual layer optical disc of claim 1, further comprising a third data layer coupled to the second data layer.

11. The dual layer optical disc of claim 10, wherein the third data layer includes an image encoded therein.

12. The dual layer optical disc of claim 1, wherein the optically viewable image is a holographic image.

13. A dual layer optical disc having an image encoded therein, the dual layer optical disc comprising:

a first layer including a plurality of lands and a plurality of pits, and a first reflective layer;

a second layer coupled to the first layer, the second layer having a plurality of lands and a plurality of pits, and a second reflective layer, and wherein the first data layer has a first effective reflectivity value, and the second data layer has a second effective reflectivity value; and an optically viewable image encoded within the first layer, wherein the optically viewable image is defined by a region within the first layer having reduced height lands.

14. The dual layer optical disc of claim 13, wherein the optically viewable image may be viewed through the second layer.

15. The dual layer optical disc of claim 13, wherein the optically viewable image is a light contrast image.

16. The dual layer optical disc of claim 13, wherein the optically viewable image is a medium contrast image.

17. The dual layer optical disc of claim 13, wherein the optically viewable image is a heavy contrast image.

18. A dual layer optical disc having an image encoded therein, the dual layer optical disc comprising:

a first protective layer;

a first layer including a first data layer having a first reflective layer formed thereover;

a second layer interposed between the first protective layer and the first layer, the second layer including a second data layer having a second reflective layer formed thereover wherein the first data layer has a first effective reflectivity value, and the second data layer has a second effective reflectivity value; and an optically viewable image encoded within the first layer or the second layers, wherein the optically viewable image is defined by a region having reduced height lands.

19. The dual layer optical disc of claim 18, wherein the first layer and the second layer have a balanced effective reflectivity value.

20. The dual layer optical disc of claim 18, wherein the first layer and the second layer have an unbalanced effective reflectivity value.

21. The dual layer optical disc of claim 18, wherein the first reflective layer is semi-reflective and the second reflective layer is reflective.

22. The dual layer optical disc of claim 18, further comprising a third layer including a third data layer having a third reflective layer formed thereover, wherein the first protective layer is formed of an adhesive and couples the second layer to the third layer.

23. The dual layer optical disc of claim 22, further comprising an optically viewable image encoded within the third layer.

24. The dual layer optical disc of claim 22, further comprising a fourth layer coupled to the third layer, including a fourth data layer having a fourth reflective layer formed thereover.

* * * * *